United States Patent
Zhang et al.

(10) Patent No.: US 8,201,791 B2
(45) Date of Patent: Jun. 19, 2012

(54) SUPPORT STAND

(75) Inventors: Han-Zheng Zhang, Shenzhen (CN); Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (CN)

( * ) Notice: Subject to any disclaimer, the term of this patent is extended or adjusted under 35 U.S.C. 154(b) by 450 days.

(21) Appl. No.: 12/347,344

(22) Filed: Dec. 31, 2008

(65) Prior Publication Data

US 2010/0059648 A1 Mar. 11, 2010

(30) Foreign Application Priority Data

Sep. 10, 2008 (CN) .......................... 2008 1 0304439

(51) Int. Cl.
*E04G 3/00* (2006.01)

(52) U.S. Cl. ................ 248/278.1; 361/679.06; 248/917; 248/919

(58) Field of Classification Search ............... 248/276.1, 248/278.1, 917–924, 284.1; 361/679.21, 361/679.22

See application file for complete search history.

(56) References Cited

U.S. PATENT DOCUMENTS

| | | | | |
|---|---|---|---|---|
| 5,299,017 A | * | 3/1994 | Furuno | 348/786 |
| 7,126,815 B2 | * | 10/2006 | Hwang et al. | 361/679.06 |
| 7,424,994 B2 | * | 9/2008 | Jeong | 248/278.1 |
| 2002/0043607 A1 | | 4/2002 | Tajima | |
| 2004/0084578 A1 | | 5/2004 | Cho et al. | |
| 2005/0247832 A1 | * | 11/2005 | Cho et al. | 248/133 |
| 2006/0201098 A1 | | 9/2006 | Jung | 52/653.1 |
| 2006/0238966 A1 | * | 10/2006 | Sung | 361/681 |
| 2006/0250347 A1 | | 11/2006 | Bertoncini | |
| 2007/0262224 A1 | * | 11/2007 | Cheng | 248/423 |

FOREIGN PATENT DOCUMENTS

| | | |
|---|---|---|
| CN | 2443462 Y | 8/2001 |
| CN | 1450295 A | 10/2003 |
| CN | 101030453 A | 9/2007 |
| TW | M324948 | 1/2008 |

* cited by examiner

*Primary Examiner* — Gwendolyn W Baxter (74) *Attorney, Agent, or Firm* — Altis Law Group, Inc.

(57) ABSTRACT

A support stand includes a base, a supporting bracket, a first hinge assembly positioned between the base and the bracket, a second hinge assembly, and a third hinge assembly. The second hinge assembly and the third hinge assembly are positioned between the supporting bracket and a display body of the electronic device. The second hinge assembly includes a connecting bracket. The third hinge assembly includes a pivot shaft and a sleeve member. The sleeve member includes a leaf and a sleeve extending from an end of the leaf. The pivot shaft is firmly engaged in the sleeve of the sleeve member.

12 Claims, 7 Drawing Sheets

SUPPORT STAND

BACKGROUND

1. Technical Field

The present disclosure relates to support stands and, more particularly, to a support stand used for supporting a display body.

2. Description of the Related Art

A typical support stand for flat-panel displays, such as liquid crystal display (LCD) monitors, generally includes a base, a monitor bracket, a first hinge assembly positioned between the base and the monitor bracket, a second hinge assembly, and a third hinge assembly positioned between the monitor bracket and a display body. The first, second, and third hinge assemblies provide rotation around three rotational axes.

However, the monitor bracket is generally made of magnesium alloy and zinc alloy. Therefore, a material cost of the monitor bracket is high. In addition, each of the first, second, and third hinge assemblies includes a plurality of resilient washers and a plurality of friction washers, to provide frictional forces. Thus, the first, second, and third hinge assemblies include many components, causing high production costs. Furthermore, the frictional forces applied on components of the support stand are unequal. Thus, a usage life of the support stand is shortened.

Therefore, a support stand to solve the aforementioned problem is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
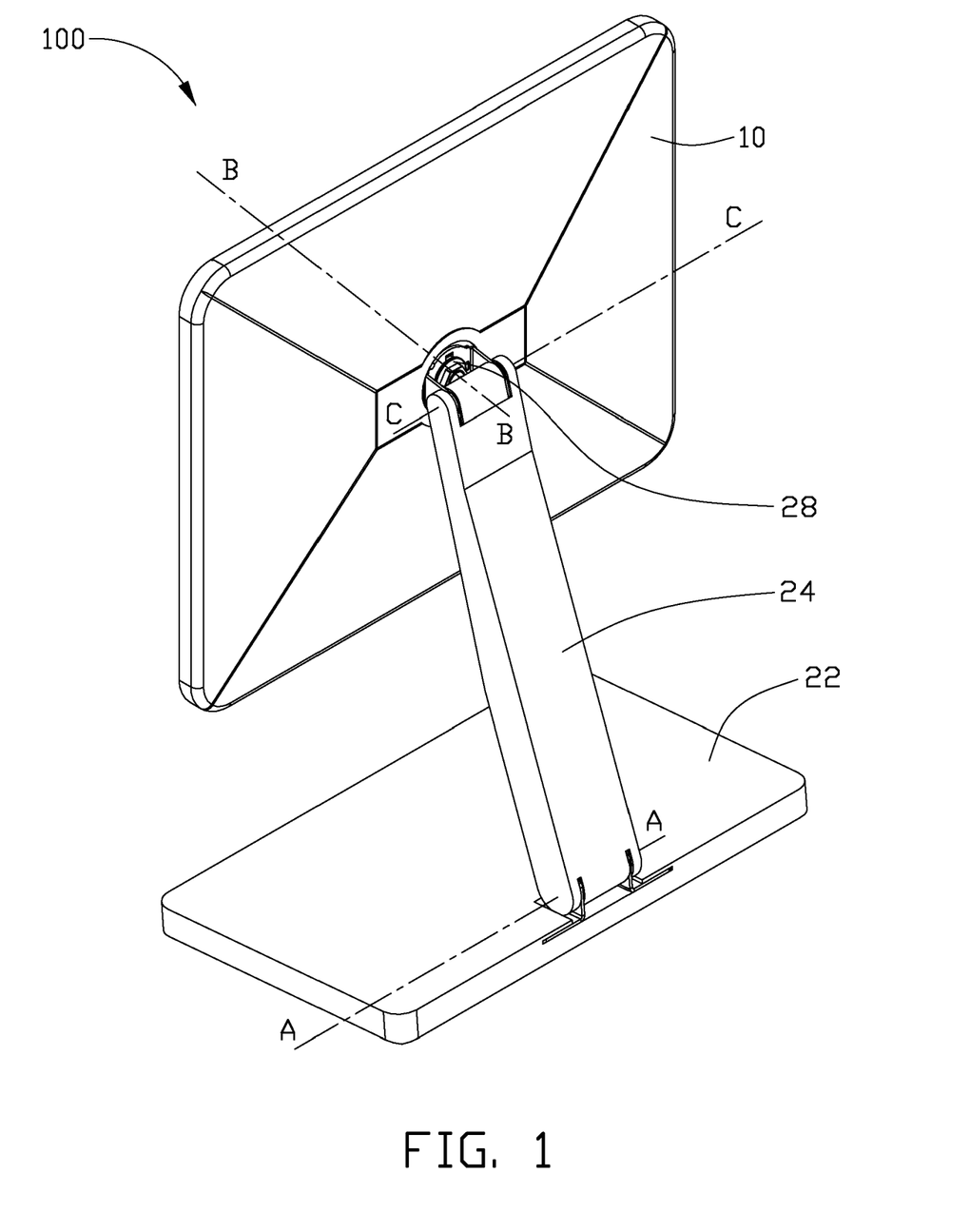
FIG. 1 is an assembled, isometric view of one embodiment of a support stand used in a liquid crystal display.
Figure 2:
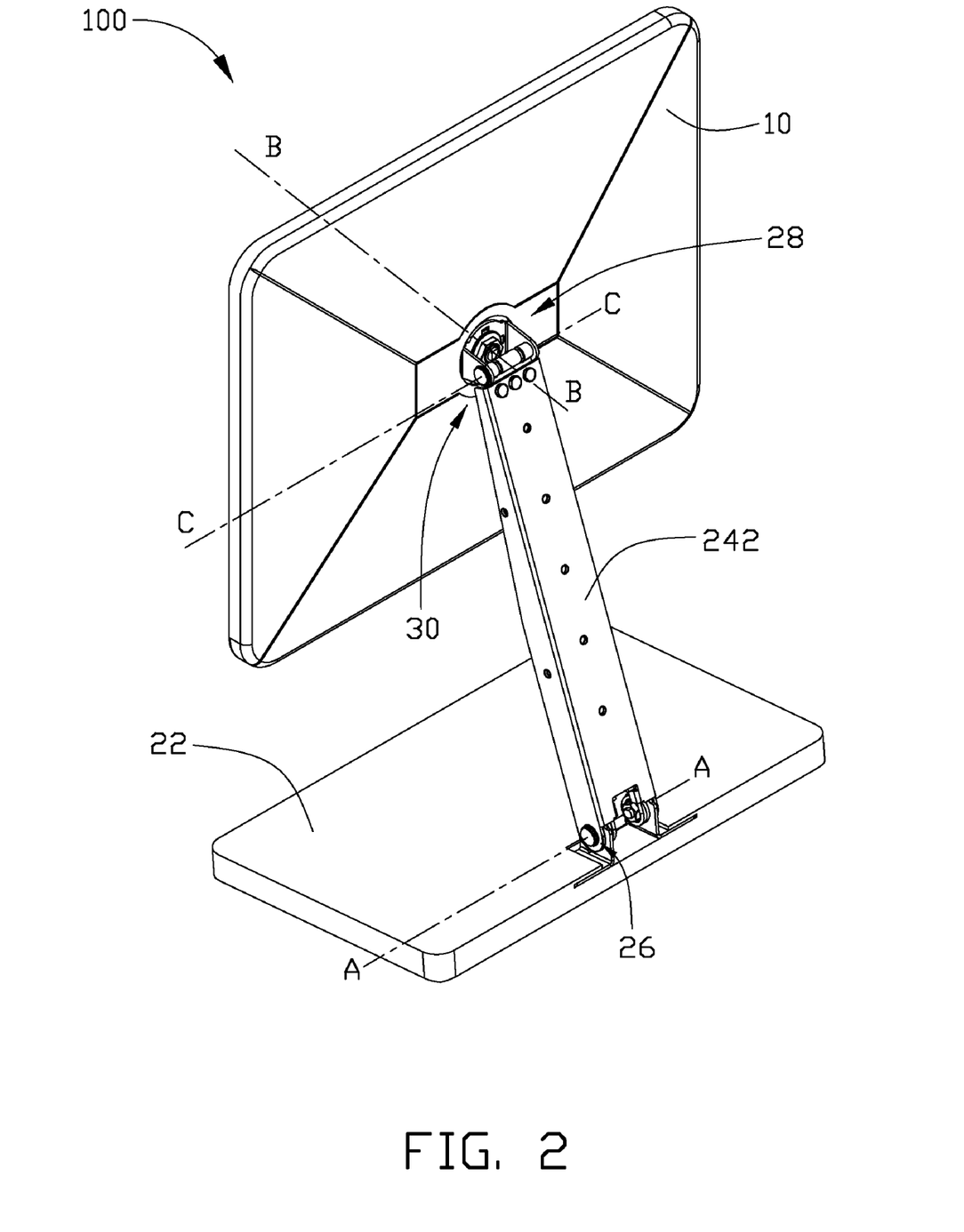
FIG. 2 is an assembled, isometric view of the support stand and the liquid crystal display of FIG. 1, without casings of the support stand.

The present disclosure may be applied in electronic device having a display body. In the illustrated embodiment, the electronic device is a liquid crystal display. Referring to FIGS. 1 and 2, a liquid crystal display 100 includes a display body 10 and a support stand 20 to support the display body 10. The support stand 20 includes a base 22, a supporting assembly 24, a first hinge assembly 26, a second hinge assembly 28, and a third hinge assembly 30.

The first hinge assembly 26 may be rotatably connected between the base 22 and the supporting assembly 24, such that the supporting assembly 24 is rotatable relative to the base 22 around a first axis A-A. The second hinge assembly 28 and the third hinge assembly 30 may be rotatably connected between the supporting assembly 24 and the display body 10, such that the display body 10 may be rotatable relative to the supporting assembly 24 around the second axis B-B and the third axis C-C, respectively.

The base 22 may be substantially rectangular shaped. The base 22 is configured to support other components of the liquid crystal display 100. Alternatively, the base 22 may be other shapes, such as circular.

Figure 3:
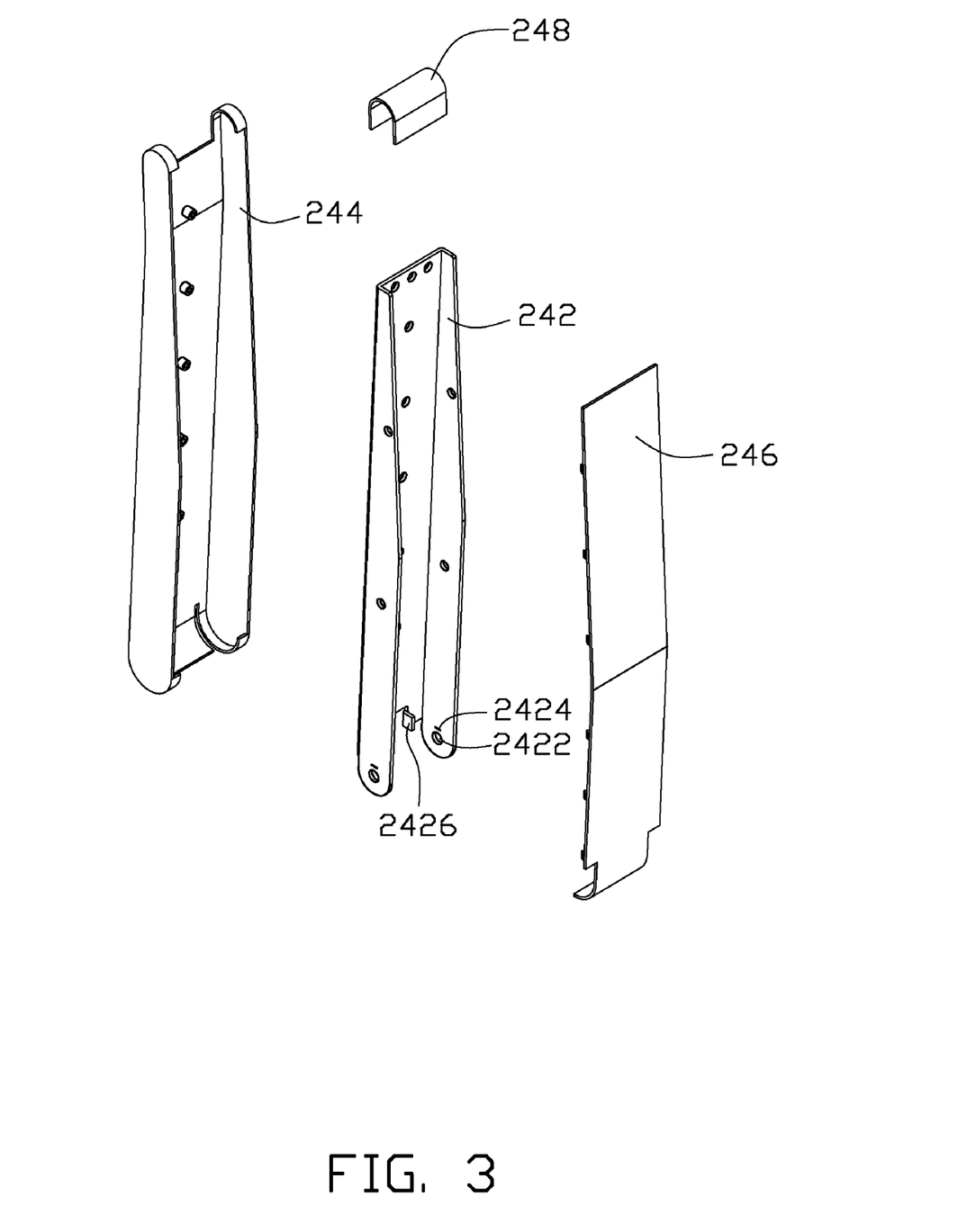
FIG. 3 is an exploded, isometric view of a supporting assembly of the support stand of FIG. 1.

Referring to FIG. 3, the supporting assembly 24 includes a supporting bracket 242, a first casing 244, a second casing 246, and a third casing 248. A cross-section of the supporting bracket 242 may be substantially U-shaped. The supporting bracket 242 may be made of a steel plate coated with a zincous layer or other protecting layers, to keep the material cost of the supporting bracket 242 low. In addition, the supporting bracket 242 may be made by punching to keep the manufacturing cost of the supporting bracket 242 low.

The first, second, and third casings 244, 246, 248 may be made of plastic. The first, second, and third casings 244, 246, 248 cover the supporting bracket 242, so that the supporting assembly 24 has a good appearance.

Figure 4:
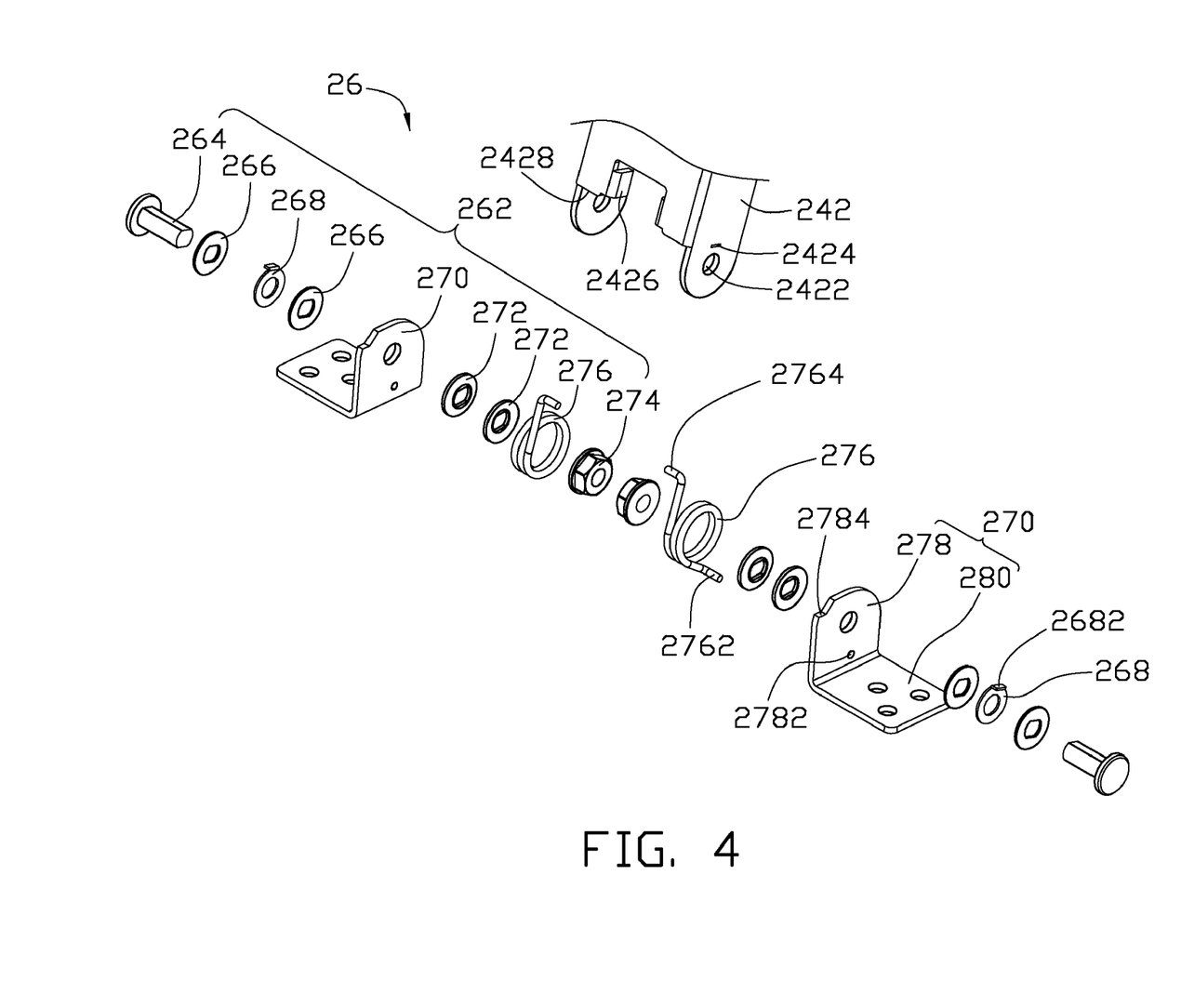
FIG. 4 is an exploded, isometric view of a first hinge assembly of the support stand of FIG. 1.

Referring to FIG. 4, the supporting bracket 242 includes a base plate (not labeled) and a pair of side plates (not labeled) extending substantially perpendicularly from the base plate. Each of the side plates defines a substantially circular connecting hole 2422 and a substantially rectangular inserting hole 2424. The supporting bracket 242 has a resisting surface 2428 adjacent to the first hinge assembly 26. An abutting portion 2426 extends substantially perpendicularly from an end of the base plate of the supporting bracket 242.

The first hinge assembly 26 includes two first hinge subassemblies 262. Each of the first hinge subassemblies 262 includes a pivot shaft 264, a pair of friction washers 266, a tab washer 268, a base bracket 270, a pair of resilient washers 272, a fixing member 274, and a torsion spring 276.

The pivot shaft 264 includes a flange (not labeled) and a non-circular shaft portion (not labeled) extending from an end surface of the flange. The flange of the pivot shaft 264 is configured to resist a corresponding washer 266. The pivot shaft 264 forms a threaded portion (not labeled) on a distal end opposite to the flange. The threaded portion of the pivot shaft 264 is configured to engage with the fixing member 274.

The friction washer 266 defines a non-circular hole in a center portion. The friction washer 266 follows the rotation of the pivot shaft 264.

The tab washer 268 may be substantially ring shaped. A tab 2682 extends from a periphery of the tab washer 268 along a direction substantially parallel to an axis of the tab washer 268. The tab 2682 is configured for engaging in the inserting hole 2424 of the supporting bracket 242, such that the tab washer 268 follows the rotation of the supporting bracket 242.

The base bracket 270 includes a connecting portion 278 and a fixing portion 280 extending substantially perpendicularly from the connecting portion 278. The connecting portion 278 defines an assembly hole 2782. A limiting surface 2784 is formed on the connecting portion 278. The limiting surface 2784 includes a slanted surface and a flat surface. The limiting surface 2784 is configured for abutting the resisting surface 2428 of the supporting bracket 242, thereby restricting a rotation range of the supporting bracket 242 relative to the base bracket 270.

The resilient washers 272 may be substantially ring shaped, and configured for providing an axial force.

The fixing member 274 may be a nut. The fixing member 274 is configured for engaging with the threaded portion of the pivot shaft 264 to press the resilient washers 272 on the pivot shaft 264.

The torsion spring 276 includes a spring coil (not labeled), a first assembling portion 2762 and a second assembling portion 2764 extending from two ends of the spring coil. The first assembly portion 2762 is inserted into the assembly hole 2782 of the base bracket 270, and the second assembly portion 2764 is latched to the abutting portion 2426 of the supporting bracket 242.

Figure 5:
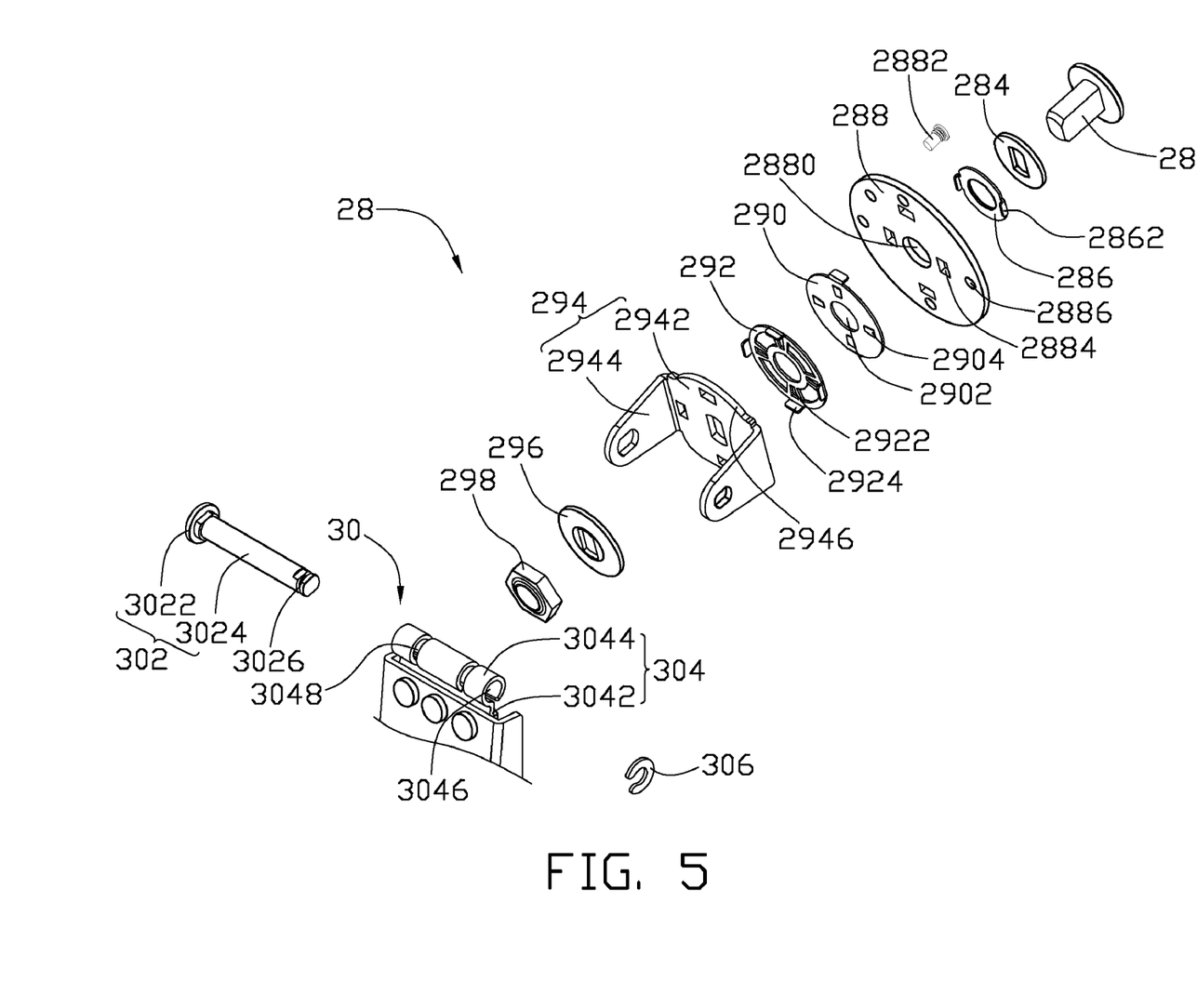
FIG. 5 is an exploded, isometric view of a second hinge assembly and a third hinge assembly of the support stand of FIG. 1.

Referring to FIG. 5, the second hinge assembly 28 includes a pivot shaft 282, a washer 284, a frictional washer 286, a rotating bracket 288, a washer member 290, a washer follower 292, a connecting bracket 294, a resilient ring 296, and a fixing member 298. The second hinge assembly 28 further includes a limiting member 2882 fixed to the rotating bracket 288. A distal end of the limiting member 2882 may be smooth.

The pivot shaft 282 includes a flange (not labeled) and a non-circular shaft portion (not labeled) extending from an end surface of the flange. The flange of the pivot shaft 282 is configured to abut the washer 284.

The frictional washer 286 may be substantially ring shaped. Two tabs 2862 extend from a periphery of the frictional washer 286 along a direction substantially parallel to the axis of the frictional washer 286.

The rotating bracket 288 may be a circular plate. The rotating bracket 288 defines a through hole 2880 in a central portion therein. The rotating bracket 288 further defines a plurality of latching holes 2884 and a plurality of circular assembly holes 2886. The latching holes 2884 and the assembly holes 2886 may be evenly arranged on a periphery of the through hole 2880.

The washer member 290 may be a circular plate, and defines a through hole 2902 in a center portion therein. A plurality of positioning protrusions 2904 may be evenly arranged at a periphery of the through hole 2902. Two tabs (not labeled) extend from a periphery of the washer member 290. The tabs 2862 of the frictional washer 286 and the tabs of the washer member 290 are configured to engage in the latching holes 2884 of the rotating bracket 288, so that the frictional washer 286 and the washer member 290 follow the rotation of the rotating bracket 288.

The washer follower 292 may be a circular plate, and defines a through hole (not labeled) in a central portion therein. The washer follower 292 further defines a plurality of positioning holes 2922 corresponding to the positioning protrusions 2904 of the washer member 290. A plurality of tabs 2924 extend from a periphery of the washer follower 292 along a direction substantially parallel to an axis of the washer follower 292.

Alternatively, the washer member 290 may define a plurality of positioning holes, and accordingly, a plurality of positioning protrusions corresponding to the positioning holes may be formed on the washer follower 292.

The connecting bracket 294 includes a main portion 2942 and two connecting portions 2944 extending substantially perpendicularly from opposite sides of the main portion 2942. Each of the main portion 2942 and the connecting portions 2944 defines a non-circular hole therein. The main portion 2942 further defines a plurality of latching holes (not labeled) configured for receiving the tabs 2924 of the washer follower 292. A top surface of the main portion 2942 may be a curved surface 2946, in which two ends of the curved surface 2946 are depressed portions (not labeled). The curved surface 2946 is configured for resisting the limiting member 2882.

The resilient ring 296 may be a circular plate. The resilient ring 296 is configured to provide an axial force.

The third hinge assembly 30 includes a pivot shaft 302, a sleeve member 304, and a clip ring 306. The pivot shaft 302 includes a flange 3022 and a non-circular shaft portion 3024 extending from an end surface of the flange 3022. The shaft portion 3024 defines a latching groove 3026 in a distal end.

The sleeve member 304 includes a leaf 3042 and a sleeve 3044 extending from an end of the leaf 3042. The leaf 3042 is fixed to the supporting bracket 242. The sleeve 3044 is formed by bending a flat plate. A cross-section of the sleeve 3044 may be substantially C-shaped. The sleeve 3044 defines a sleeve hole 3046 having a diameter slightly smaller than a diameter of the shaft portion 3024 of the pivot shaft 302. The sleeve 3044 further defines a plurality of lubricant holes 3048 extending through a sidewall of the sleeve 3044.

The clip ring 306 may be substantially a C-shaped clip. The clip ring 306 is configured to engage into the latching groove 3026 of the pivot shaft 302, thereby preventing the sleeve member 304 from being detached from the pivot shaft 302.

Figure 6:
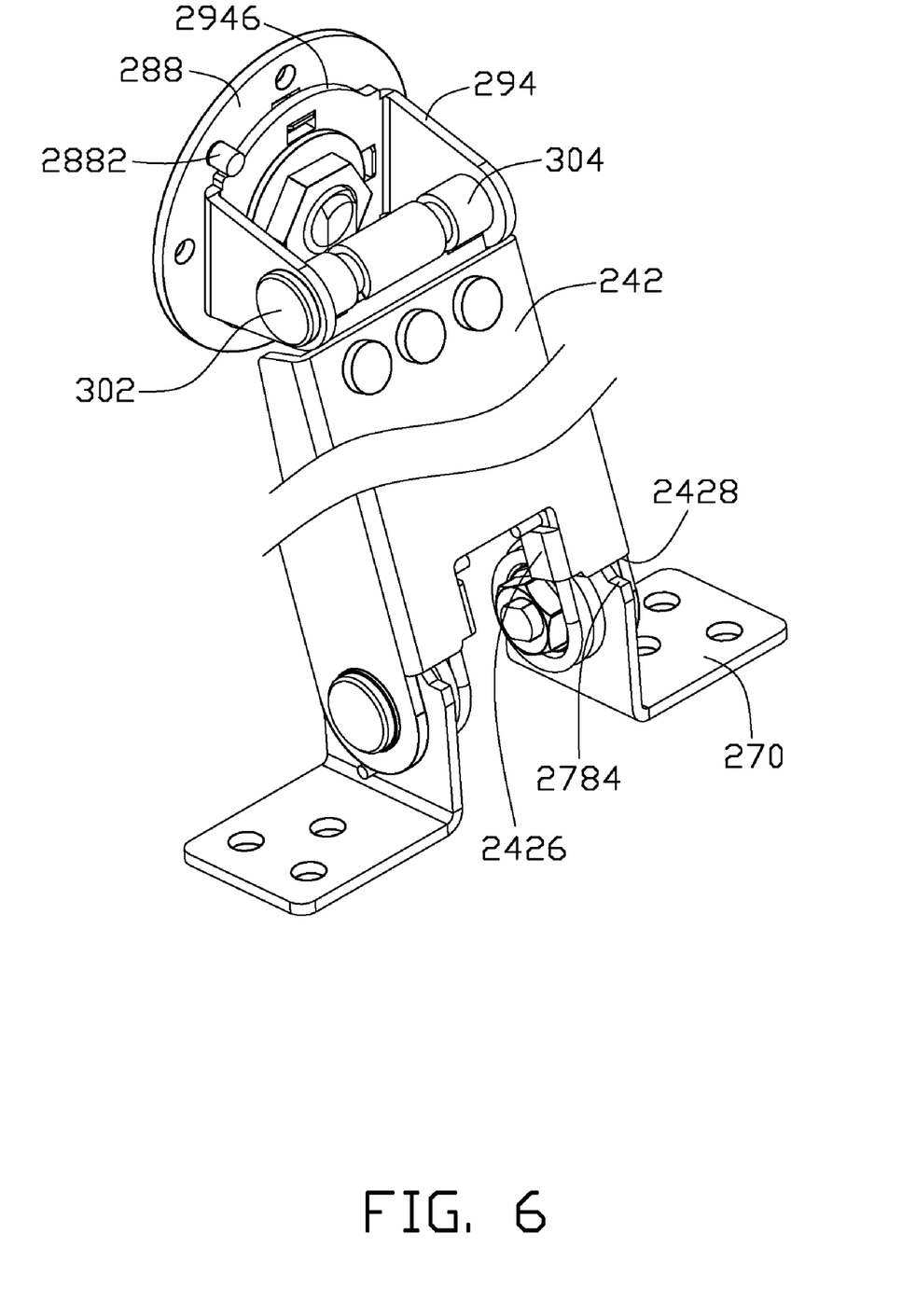
FIG. 6 is an assembled, isometric view of the support stand of FIG. 1.

Referring to FIGS. 4 through 6, in assembly, the pivot shaft 264 of each first hinge assembly 26 is passed through the friction washer 266, the connecting hole 2422 of the supporting bracket 242, the tab washer 268, the other friction washer 266, the connecting portion 278 of the base bracket 270, and the resilient washers 272, in that order. The tab 2682 of the tab washer 268 is inserted into the inserting hole 2424 of the supporting bracket 242. The fixing member 274 engages with the threaded portion of the pivot shaft 264. The torsion spring 276 is sleeved on the resilient washers 272 and the fixing member 274. The first assembling portion 2762 of the torsion spring 276 is inserted into the assembly hole 2782 of the base bracket 270, and the second assembling portion 2764 of the torsion spring 276 is latched to the abutting portion 2426 of the supporting bracket 242. The torsion spring 276 is deflected. The base bracket 270 is fixed to the base 22. Thus, the first hinge assembly 26 is assembled. The washer 266 and the resilient washers 272 follow the rotation of the pivot shaft 264. The supporting bracket 242 and the tab washer 268 are rotatable relative to the pivot shaft 264. The torsion spring provides an elastic force.

The pivot shaft 282 of the second hinge assembly 28 is passed through the washer 284, the frictional washer 286, the through hole 2880 of the rotating bracket 288, the through hole 2902 of the washer member 290, the washer follower 292, the main portion 2942 of the connecting bracket 294, and the resilient ring 296, in that order. The fixing member 298 engages with a distal end of the pivot shaft 282. The tabs 2862 of the frictional washer 286 and the tabs of the washer member 290 are inserted into the latching holes 2884 of the rotating bracket 288. The tabs 2924 of the washer follower 292 are inserted into the latching holes of the connecting bracket 294. The washer 284, the washer follower 292, the connecting bracket 294, and the resilient ring 296 follow the rotation of the pivot shaft 282. The frictional washer 286, the rotating bracket 288, and the washer member 290 are rotatable relative to the pivot shaft 282.

The limiting member 2882 is fixed to the rotating bracket 288. A periphery surface of the distal end of the limiting member 2882 abuts the curved surface 2946 of the connecting bracket 294, thereby restricting the rotational range of the connecting bracket 294. The rotating bracket 288 is fixed to the display body 10 of the liquid crystal display 100. Thus, the second hinge assembly 28 is assembled.

The shaft portion 3024 of the pivot shaft 302 of the third hinge assembly 30 is passed through one of the connecting portions 2944 of the connecting bracket 294, the sleeve hole 3046 of the sleeve member 304, and the other connecting portions 2944 of the connecting bracket 294, in that order. The shaft portion 3024 of the pivot shaft 302 is firmly engaged in the sleeve hole 3046 of the sleeve member 304. The clip ring 306 is engaged into the latching groove 3026 of the pivot shaft 302. The leaf 3042 of the sleeve member 304 is fixed to the supporting bracket 242. Thus, the third hinge assembly 30 is assembled.

The first, second, and third casings 244, 246, 248 cooperatively cover the supporting bracket 242. Thus, the liquid crystal display 100 is assembled.

Referring also to FIG. 2, the first, second, and third axes A-A, B-B, C-C respectively correspond to the axis of the pivot shaft 264 of the first hinge assembly 26, the axis of the pivot shaft 282 of the second hinge assembly 28, and the axis of the pivot shaft 302 of the third hinge assembly 30. In use, when a force is applied on the display body 10 to drive the display body 10 to rotate around the first axis A-A, the display body 10 drives the supporting bracket 242 to rotate around the first axis A-A. An end of the supporting bracket 242 connected to the display body 10 is moved away from the base 22. The torsion spring 276 creates an elastic force, thereby reducing the force enabling the display body 10 to rotate. The display body 10 rotates around the first axis A-A until the resisting surface 2428 of the supporting bracket 242 abuts the limiting surface 2784 of the base bracket 270. In the illustrated embodiment, a rotation range of the supporting bracket 242 rotating around the first axis A-A is about 0 degrees to about 90 degrees. The rotational range may be varied.

When a force is applied on the display body 10 to drive the display body 10 to rotate around the second axis B-B, the display body 10 drives the rotating bracket 288 to rotate around the second axis B-B. The washer member 290 rotates relative to the washer follower 292. When the display body 10 rotates through predetermined positions, the positioning protrusions 2904 of the washer member 290 engage in the positioning holes 2922 of the washer follower 292. As such, it is more difficult to rotate the display body 10 in the predetermined positions than in other positions. The limiting member 2882 abuts the curved surface 2946 of the connecting bracket 294 and slides along the curved surface 2946. The force enabling the display body 10 to rotate is substantially stable. The display body 10 stops rotating when the limiting member 2882 fits into the depressed portions of the curved surface 2946. In the illustrated embodiment, a rotational range of the display body 10 rotating around the second axis B-B is about 0 degrees to about 90 degrees.

When a force is applied on the display body 10 to drive the display body 10 to rotate around the third axis C-C, the display body 10 drives the connecting bracket 294 to rotate around the third axis C-C. The pivot shaft 302 of the third hinge assembly 30 rotates relative to the sleeve member 304. The display body 10 may remain in any desired position due to the friction force between the pivot shaft 302 and the sleeve member 304. In the illustrated embodiment, a rotatable range of the display body 10 around the third axis C-C is about 0 degrees to about 180 degrees.

Figure 7:
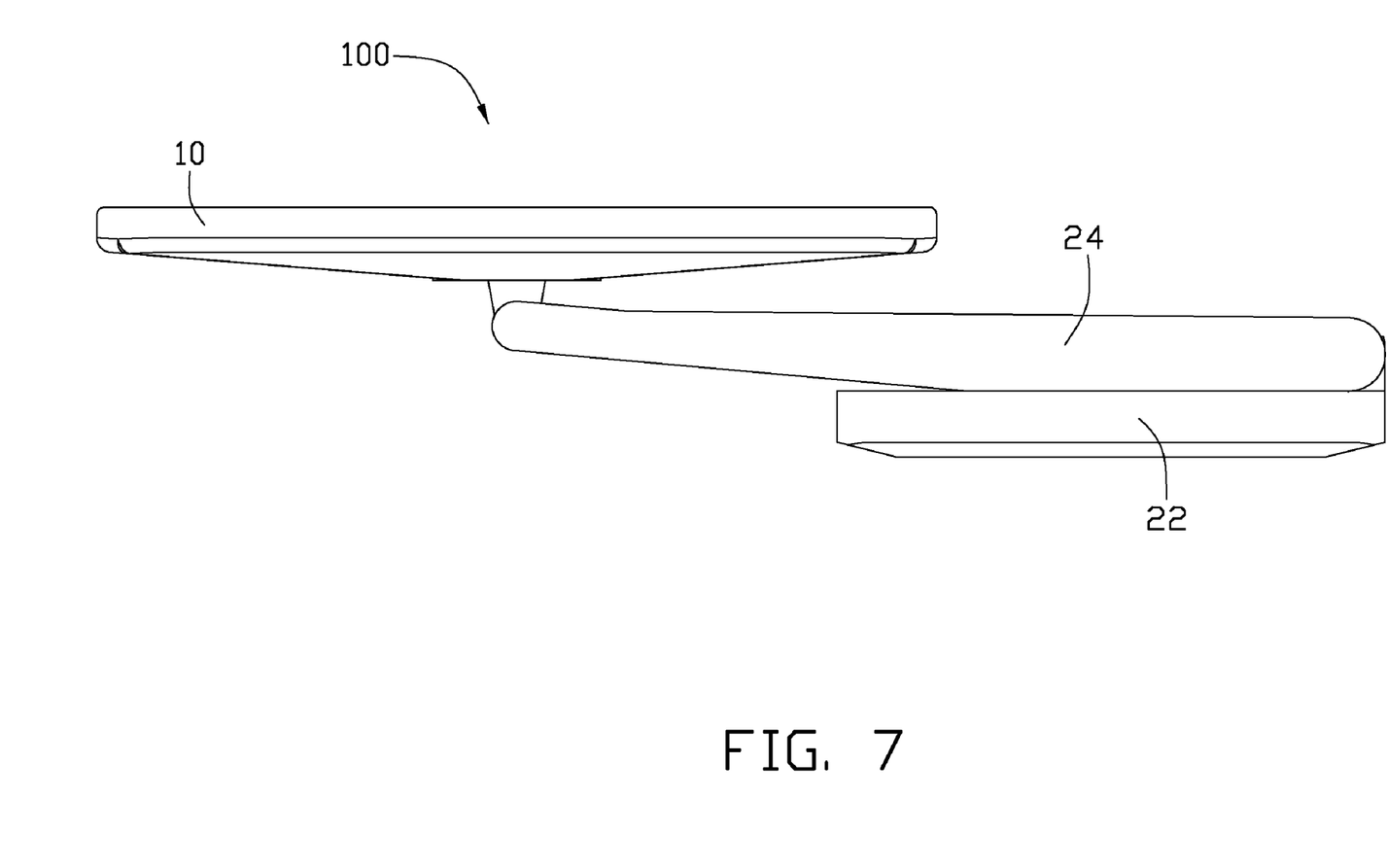
FIG. 7 is an isometric view of the liquid crystal display of FIG. 1, showing the liquid crystal display in a folding state.

When the support stand 20 is adopted in the liquid crystal display 100, the liquid crystal display 100 may be folded to a shape as shown in FIG. 7. The display body 10, the supporting assembly 24, and the base 22 substantially parallel to one another, thereby decreasing an occupying space of the liquid crystal display 100.

In the illustrated embodiment, the number of components of the third hinge assembly 30 is small, so that the third hinge assembly 30 may be easily assembled and disassembled. The gravitational force of the display body 10 acts on the third hinge assembly 30. An engaging surface between the pivot shaft 302 and the sleeve member 304 is large, thereby preventing the gravitational force from concentrating on a portion of the hinge assembly 30. Thus, a work life of the hinge assembly 30 is prolonged.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A support stand used for supporting a display body, comprising:
    a base;
    a supporting bracket;
    a first hinge assembly positioned between the base and the supporting bracket;
    a second hinge assembly positioned between the supporting bracket and the display body, the second hinge assembly comprising a connecting bracket and a rotating bracket fixed to the display body, wherein the connecting bracket comprises a main portion and two connecting portions extending from opposite sides of the main portion, a top surface of the main portion of the connecting bracket is a curved surface, the rotating bracket is rotatable relative to the connecting bracket, a limiting member is fixed to the rotating bracket, the limiting member abuts the curved surface of the connecting bracket, thereby restricting a rotational range of the connecting bracket; and
    a third hinge assembly positioned between the supporting bracket and the display body, wherein the first hinge assembly, the second hinge assembly, and the third hinge assembly providing rotation around three rotational axes; the third hinge assembly comprising: a sleeve member comprising a leaf fixed to the supporting bracket and a sleeve extending from an end of the leaf; and a pivot shaft firmly engaged in the sleeve of the sleeve member and passing through the two connecting portions of the connecting bracket, wherein the second hinge assembly further comprises a washer member and a washer follower, one of the washer member and the washer follower forms at least one positioning protrusion, the other of the washer member and the washer follower defines at least one positioning hole corresponding to the at least one positioning protrusion.

2. The support stand of claim 1, wherein the supporting bracket is made of a steel plate coated with a zincous layer.

3. The support stand of claim 1, wherein each of the washer member and the washer follower forms a plurality of tabs; the tabs of the washer member are engaged with the rotating bracket, so that the washer member follows the rotation of the rotating bracket; the tabs of the washer follower are engaged with the connecting bracket, so that the washer follower follows the rotation of the connecting bracket.

4. The support stand of claim 1, wherein the first hinge assembly further comprises a base bracket, the base bracket has a limiting surface; the supporting bracket has a resisting surface; the resisting surface of the supporting bracket abuts the limiting surface of the base bracket, thereby restricting a rotational range of the bracket relative to the base bracket.

5. The support stand of claim 4, wherein the first hinge assembly further comprises a torsion spring, the torsion spring comprises a first assembling portion and a second assembling portion; the first hinge assembly portion is connected to the base bracket, and the second hinge assembly portion is latched to the supporting bracket, such that the torsion spring is deflected.

6. The support stand of claim 1, wherein a cross-section of the supporting bracket is substantially U-shaped.

7. The support stand of claim 6, wherein the support stand further comprises a plurality of plastic casings, the supporting bracket are covered by the plastic casings.

8. The support stand of claim 1, wherein the third hinge assembly further comprises a clip ring, the pivot shaft of the third hinge assembly defines a latching groove in a distal end; the clip ring is latched in the latching groove.

9. A support stand, comprising:
a supporting assembly comprising a supporting bracket;
a first hinge assembly connected to a first end of the supporting bracket;
a second hinge assembly connected to a second end of the supporting bracket opposite to the first end, the second hinge assembly comprising a connecting bracket and a rotating bracket, wherein the connecting bracket comprises a main portion and two connecting portions extending from opposite sides of the main portion, a top surface of the main portion of the connecting bracket is a curved surface, the rotating bracket is rotatable relative to the connecting bracket, a limiting member is fixed to the rotating bracket, the limiting member abuts the curved surface of the connecting bracket, thereby restricting a rotational range of the connecting bracket; and
a third hinge assembly connected to the second hinge assembly and the second end of the supporting bracket, wherein the first hinge assembly, the second hinge assembly, and the third hinge assembly providing rotation around three rotational axes; the third hinge assembly comprising: a sleeve member comprising a leaf fixed to the supporting bracket and a sleeve extending from an end of the leaf; a pivot shaft firmly engaged in the sleeve of the sleeve member passing through the two connecting portions of the connecting bracket, wherein the second hinge assembly further comprises a washer member and a washer follower, one of the washer member and the washer follower forms at least one positioning protrusion, the other of the washer member and the washer follower defines at least one positioning hole corresponding to the at least one positioning protrusion.

10. The support stand of claim 9, wherein the supporting bracket is made of a steel plate coated with a zincous layer.

11. The support stand of claim 9, wherein the first hinge assembly further comprises a base bracket, the base bracket has a limiting surface; the supporting bracket has a resisting surface; the resisting surface of the supporting bracket abuts the limiting surface of the base bracket, thereby restricting a rotational range of the bracket relative to the base bracket.

12. The support stand of claim 11, wherein the first hinge assembly further comprises a torsion spring, the torsion spring comprises a first assembling portion and a second assembling portion; the first hinge assembly portion is connected to the base bracket, and the second hinge assembly portion is latched to the supporting bracket, such that the torsion spring is deflected.

* * * * *